US007188360B2

(12) United States Patent
Gerdes et al.

(10) Patent No.: US 7,188,360 B2
(45) Date of Patent: Mar. 6, 2007

(54) UNIVERSAL AUTHENTICATION MECHANISM

(75) Inventors: Martin Gerdes, Herzogenrath (DE); Frank Hartung, Herzogenrath (DE); Silke Holtmanns, Baesweiler (DE); Marko Schuba, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 814 days.

(21) Appl. No.: 10/225,834

(22) Filed: Aug. 22, 2002

(65) Prior Publication Data

US 2003/0046541 A1    Mar. 6, 2003

(30) Foreign Application Priority Data

Sep. 4, 2001    (EP)    ................... 01121164

(51) Int. Cl.
G06F 7/04       (2006.01)
G06F 15/16      (2006.01)
H04L 9/00       (2006.01)

(52) U.S. Cl. .................. 726/4; 726/3; 726/9; 726/26; 713/153; 713/168; 713/182; 709/217; 709/225; 709/229

(58) Field of Classification Search ............... 726/26, 726/28, 10
See application file for complete search history.

(56) References Cited

U.S. PATENT DOCUMENTS 5,668,876 A * 9/1997 Falk et al. ................. 380/271

FOREIGN PATENT DOCUMENTS

WO    WO 99/44114       9/1999
WO    WO 01/54438 A1    7/2001

OTHER PUBLICATIONS

"Microsoft Passport Technical White Paper", http://www.passport.com/Business/WhitePaper.asp?1c=1033, Sep. 4, 2001, (pp. 1-12.).
"Microsoft Passport Privacy and Security Overview", http://www.passport.com/Business/PrivacyAndSecurity.asp?1c=1033, Sep. 4, 2001, (pp. 1-13).
Arbutina, L., European Search Report for EP 01 12 1164 as completed Feb. 8, 2002, (2 pgs.).
Stallings, W., *Network and Internetwork Security Principles and Practice*, 1995, Prentice Hall, Englewood Cliffs, New Jersey, Chapter 8, (pp. 314-359).

* cited by examiner

*Primary Examiner*—Gilberto Barrón, Jr.
*Assistant Examiner*—A. Nobaher

(57) ABSTRACT

A universal authentication mechanism for authenticating a user to a service provider (SP) is disclosed. An application device (ApD) requests a service for the user from the service provider (SP) and performs a transmission of a user identity (S10) identifying the user to the service provider (SP). The service provider sends a request for confirmation of the user identity (S20) to an authentication server (AS). The request comprises the user identity and a service identity identifying the requested service. The authentication server (AS) sends a request for service authentication (S50) to the authentication device (AuD) for confirmation. Based on the result of an analysis (S80) of a service authentication confirmation (S60) received from the authentication device (AuD), the authentication server (AS) sends a confirmation of the user identity (S90) confirming the identity of the user to the service provider (SP), which grants service access (S100).

26 Claims, 3 Drawing Sheets

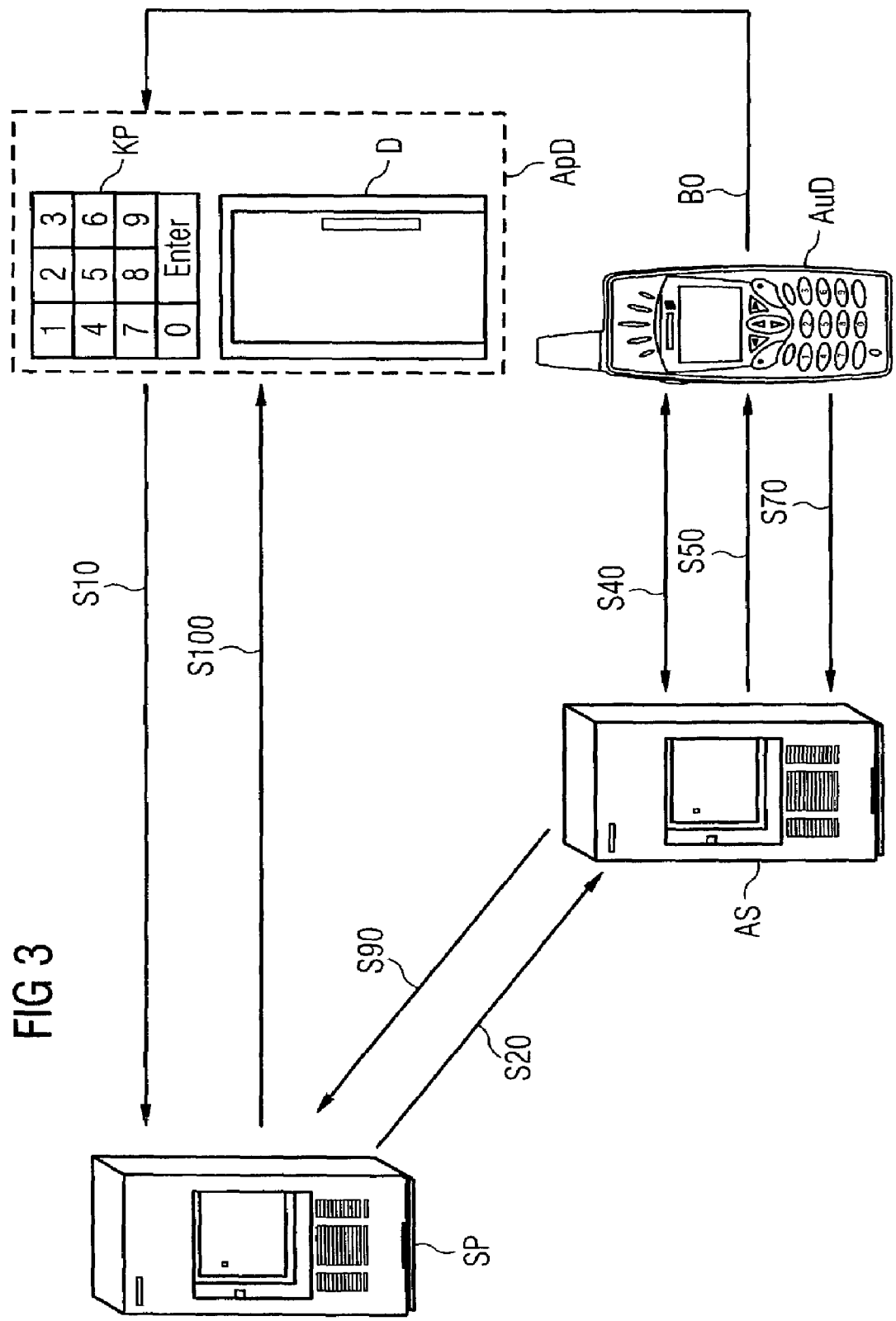

UNIVERSAL AUTHENTICATION MECHANISM

TECHNICAL FIELD OF THE INVENTION

The present invention relates to the field of access authorization, especially to a method for authentication of a user to a service provider, wherein an application device requests a service for the user from the service provider and the service provider requests an authentication of the user by an authentication server before granting access to the requested service. The invention also concerns an authentication server and a computer program loadable into an authentication server.

BACKGROUND OF THE INVENTION

An increasing number of applications or services in the real as well as the virtual world like the Internet require authorization in order to get service access. For granting service access to a user, first of all the identity of the user must be verified or proved to the provider offering the service. This procedure is generally understood as the authentication of a user to a service provider. Examples for such applications or services are a login to a web server for information access, login to a Personal Computer (PC) or workstation, login to a corporate network or an Intranet, automated payment transactions, and also access to buildings, cars, and automated teller machines (ATMs).

In another example, to get access to a door, a personal identification number (PIN) has to be entered by the user, typically into a keypad located close to the door. The input number is checked and access is granted if the number is found to be valid, e.g. the by checking if the entered number matches a number stored in a memory. An alternative authentication mechanism for a door-opener is a magnetic card which has to be entered into a card reader mounted in the vicinity of the door. In this example, the card reader reads out the data stored on the magnetic card and checks, e.g. the correctness and validity of the data.

Magnetic or chip cards and card readers are also used for ATMs. Before getting access to an offered service, e.g. bank account monitoring, retrieving cash from an account, or payment transactions from an account to another account, the user has to enter his card into the card reader and to type in a PIN for authentication not only the device but also the user to the ATM. The combination of the card with the PIN enhances the security of the authentication mechanism compared to access situations wherein only one mechanism is used, e.g. only a card with card reader or only a PIN with keypad. Generally, the combination or concatenation of security mechanisms makes the authentication procedure more secure but requires more effort, e.g. by the user who has to handle a card and a PIN, or by the devices which become more complicated and may suffer from increased processing expense for carrying out the authentication procedure.

An authentication mechanism for getting service access on an open computer network consisting of distributed user workstations and distributed and/or centralized servers is Kerberos® (see e.g. W. Stallings, "*Network and Internet Security*", Englewood Cliffs, N.J., Prentice-Hall, 1995, chapter 8.1). A Kerberos® system consists basically of a workstation of a user, a server, e.g. of a service provider, and a Kerberos® server comprising an authentication server and a ticket-granting server. The authentication server stores the passwords of all users and services in a secure database and issues tickets to users being already authenticated to the authentication server for getting access to the ticket-granting server, which supplies the user with tickets for multiple service access. A ticket contains the identity of the user, a session key, a time stamp, and other information, all encrypted by a secret key of the server of the service provider.

The basic Kerberos® authentication process for authenticating the user to the service provider proceeds as follows: the user logs on to a workstation, e.g. by entering a user identity and a password, and sends a request to the Kerberos® server requesting credentials for a given server of the service provider. The credentials consist of a ticket for the server of the service provider and a session key. The Kerberos® server responds with these credentials being encrypted with the user's key. The user decrypts the credentials and transmits the ticket to the server of the service provider together with a copy of the session key, all encrypted by the server's key, for authentication of the user to the service provider.

An online user authentication service is provided by Microsoft® Passport (see http://www.passport.com), especially for authentication to Internet services, e.g. access to web pages or Internet shopping. As a prerequisite, the user and the service provider have to subscribe to the authentication service and user and service provider related data are stored in the database of an authentication server. When the user logs into his PC or a wireless device supporting the Wireless Application Protocol (WAP) and demands access to a web page enabled to the authentication service, the user is redirected to the authentication server. In parallel, the service provider transmits a service provider identity and the associated internet address to the authentication server. The authentication server checks if an entry in the database is matched and authenticates the service provider. Similarly, the user authenticates himself to the authentication server by submitting his user identity and a password. Subsequently, the authentication server extracts an authentication identifier attributed to the user for authenticating the user to the service provider and incorporates the authentication identifier into an encrypted cookie. The cookie is stored on the PC of the user and an encrypted ticket comprising the authentication identifier is sent to the service provider for authentication of the user. After decryption of the ticket and extraction of the authentication identifier, the user is authenticated to the service provider and access to the service is granted to the user.

Authentication mechanisms as described above have in common that they aim to and are optimized for a specific access situation, e.g. only for login to a PC or network, or only for access to a service on the Internet, or only for access to a building, or only for access to an ATM. Applying such an authentication mechanism to another access situation fails. One reason for the non-interoperability of different authentication mechanisms is ascribed to the different technologies used for authentication, e.g. cards, PINs, or passwords. Even in the case that different authentication mechanisms make use of the same technology, different service providers typically require different peculiarities, e.g. typically a credit card cannot be used in the card reader in order to get access to a building. This situation is not very convenient for the user as he has to remember a large number of PINs, passwords, user names or aliases, and has to carry a large number of physical access devices like plastic cards or physical keys for access to buildings and cars. Especially the large number of PINs and passwords result in a very high access rejection rate, because users are simply not able to remember all the codes or mix them up.

In addition, physical access devices can get lost or forgotten somewhere or be damaged in day-to-day use, preventing the user to get access.

Biometric authentication mechanisms provide a way to overcome these problems, because a biometric data set derived for example from a finger print or an iris of the user, is unambiguously linked to the individual user. However, the main problem with biometrics is that the biometric data set cannot be changed. If a biometric data set is disclosed, e.g. by a photocopy of a fingerprint, there are no means to generate a new set. Consequently, either the user is excluded from further access to services based on biometric authentication or the possibility of misuse arises.

SUMMARY OF THE INVENTION

It is an object of the present invention to provide an improved method, authentication server and computer program loadable into an authentication server, which enable a secure and convenient authentication of a user to a service provider for a large variety of access situations.

This object is achieved by the method as described in claim 1. Furthermore, the invention is embodied in an authentication server as described in claim 13 and a computer program loadable into an authentication server as described in claim 20. Advantageous embodiments are described in the further claims.

In the proposed method, an application device requests a service for a user from a service provider. Before granting access to the user, the service provider requires an authentication of the user. The authentication to the service provider may be initialized by the service provider or the user. The proposed authentication method starts with the transmission of a user identity to the service provider. The user identity identifies the user and can consist of a name or a number or any other kind of identifier known by the service provider. The service provider sends a request for confirmation of the user identity to an authentication server. The request for confirmation of the user identity comprises the user identity and a service identity for identification of the user and the requested service to the authentication server, respectively. As in the case of the user identity, the service identity can consist of a name or a number or any other kind of identifier. Depending on the implementation of the proposed method, e.g. of the subscription or registration of the service provider to the authentication server, this identifier indicates not only the requested service but also the service provider.

The authentication server generates a request for service authentication and transmits the request to an authentication device of the user. The request for service authentication indicates the requested service to the authentication device and preferably to the user. The authentication device generates a service authentication confirmation confirming the request for service authentication and sends the service authentication confirmation to the authentication server. The authentication server performs an analysis of the service authentication confirmation, e.g. it is checked if the request for service authentication has been correctly acknowledged by the authentication device or if the service authentication confirmation is received within a pre-defined time limit after issuing the request for service authentication. If the analysis fails, the authentication server may repeat the transmission of a request for service authentication or may terminate the authentication procedure. Preferably, the authentication server informs the parties about the termination.

After successful completion of the analysis, the authentication server sends a confirmation of the user identity to the service provider. The confirmation of the user identity confirms the request for confirmation of the user identity issued by the service provider. Based on the received confirmation of the user identity, the service provider finally grants service access to the user or can request additional information before granting service access, e.g. a credit card number of the user for services charging costs to the user.

In the proposed method, separate devices for the application of the service and authentication of the user are used. In addition, an authentication server is introduced which stores and manages identities of service providers and users. The authentication server establishes a trusted relationship between the service provider and the authentication server and between the user and the authentication server, and hence, between the service provider and the user. The authentication server presents the requested service to the authentication device and requests a confirmation of the requested service. The user has to transmit only the user identity and a confirmation and a large number of passwords can be avoided. Identities involved in the method can be changed, e.g. by the user or the service provider, therefore preventing misuse if one of the identities is disclosed. Owing to the fact that the authentication device can be separated from the application device, the authentication device and thus the method can be adapted to serve a large variety of access situations and a large number of different application devices. The proposed method makes the authentication very secure and very convenient especially for the user, because a single authentication service can authenticate him to one or more services or service providers for a large variety of access situations and application devices without having to remember a bunch of passwords or carrying a number of physical access devices. In addition, the method ensures the authenticity of the requested service to both, the user and the authentication server.

According to a preferred embodiment of the method, an authentication is performed between at least one pair of devices from a group comprising the pairs: the application device and the service provider, the service provider and the authentication server, and the authentication server and the authentication device. Preferably, a mutual authentication between said pairs of devices is established enhancing further the security of the method. Authentication can be achieved e.g. by a Secure Sockets Layer (SSL) Protocol.

Preferably, a verification of at least one of the identities comprising the user identity and the service identity is performed. The verification can be performed by the device receiving an identity, e.g. the service provider receiving the user identity or the authentication server receiving the user identity and the service identity or the authentication device receiving the service identity for indicating the requested service. The verification comprises an analysis of an identity, e.g. the device receiving an identity checks if the identity matches a respective entry in a database. If there is no entry in the database, the receiving device may terminate the authentication procedure or may alternatively contact the party whose entry is missing, e.g. for requesting a subscription or registration to the authentication service. Another part of the verification is the processing of an identifier associated with an identity. The identifier used for identifying the user to the service provider can be identical or can be different from the identifier used for identifying the user to the authentication server. The same applies for the identifiers associated with the service provider identity for identifying the service to the authentication server and the authentication device. For the case, that the respective identifiers of an identity are identical, the identifier can be simply forwarded. Otherwise, a conversion of the identifier is performed before transmission. Such a conversion can be accomplished by a look-up table. For the service provider, this look-up table can comprise the correlation of the user identities as registered to the service provider and the authentication server, e.g. being a name of the user and a registration number, respectively. For the authentication server, such a look-up table may be introduced for the service identities as registered to the authentication server and for identification to the user. The verification makes the proposed method more secure and flexible, because it allows a flexible adaptation of the method when changing an identity or identifier, e.g. when the respective identity or identifier gets disclosed.

Preferably, an address of the authentication device is attributed to the user identity. Depending on the implementation of the method, the address can be collected from the user during registration to the authentication service or can be assigned by the authentication service. The address is preferably stored in a secure database accessible by the authentication sever. For retrieving the address, the user identity and the address can be correlated, e.g. by a look-up table. The authentication server can then identify and select the address from the database based on an analysis of the user identity. This analysis can be executed while executing the verification of the user identity, e.g. by searching the database for the user identity and retrieving a respective entry for an address attributed to the user identity. The look-up table may be not restricted to a one-to-one relationship between a user identity and an address but can comprise also more than one address per user identity, e.g. if the user has different addresses for business or private services. The proposed management of the address of the authentication device by the authentication server allows a very flexible implementation of the authentication service for many service solutions. Furthermore, an easy replacement of an address is possible if an authentication device gets lost.

According to a preferred embodiment, the authentication server identifies itself to the user by sending a keyword to the authentication device of the user. The keyword is attributed to the user identity and can be set by the user during the registration to the authentication server. The keyword can be a name, number or any other kind of identifier like a text or a signature or a record of the user's voice. An advantageous embodiment is a keyword that can be changed by the user, e.g. in pre-defined intervals or on request. As in the case for the address, the keyword can be stored in a look-up table in a secure database. The authentication server can retrieve the keyword from the database based on an analysis of the user identity. This analysis can be executed while executing the verification of the user identity, e.g. by searching the database for the user identity and retrieving a respective entry for a keyword attributed to the user identity. The keyword is sent to the authentication device, where it is indicated to the user, e.g. on a display or by voice output. The introduction of the keyword makes the method even more secure and trustful, because it proves the identity of the authentication server requesting a service authentication to the user. If the user has doubt about the authenticity of the authentication server, he may terminate the service access.

According to a preferred embodiment, the keyword is included into the request for service authentication, which reduces the number of individual messages. In addition, the combination and concatenation of security features makes the method more secure, because it is more difficult to interfere.

Preferably, an encryption is applied to at least one of the identities or confirmations or requests. Sent information like identities or confirmations or requests can be encrypted by the sending entity and received information can be decrypted by the receiving entity. This prevents an eavesdropper from gaining access to the exchanged information. The security of the method can be further enhanced if a signature is applied to at least one of the identities or confirmations or requests. Sent information can be signed and received information can be authenticated by applying an appropriate key. Both, symmetric as well as asymmetric encryption methods can be used for encryption and signatures. Keys associated with an encryption method can be exchanged during registration to the authentication service or can be exchanged within the proposed authentication method, e.g. by an additional message or in a dialog. Preferably, a time stamp is applied to at least one of the identities or confirmations or requests. For sent information a time stamp may be added with the time stamp indicating the date of issue or validity of the corresponding information. Preferably, a reliable time source is used for the processing of time stamps. At the receiving entity, the time stamp may be analyzed, e.g. it can be checked if the information has been received within a certain time limit. The introduction of time stamps enhances the security of the method as it prevents replay attacks. Extended protection can be achieved for a combination or concatenation of encryption or signatures or time stamps. Multilevel encryption or hashing are examples.

According to a preferred embodiment, the generation of the service authentication confirmation or the transmission of the service authentication confirmation requires an entering of a password. The password can be a personal identification number (PIN), a name or any other kind of identifier attributed to the user and can be used for authentication of the user to the authentication device and thus to the authentication server. The password can be entered when activating the authentication device. Preferably, the password is entered for confirming the request for service authentication. As a consequence, the service authentication confirmation may be signed for authenticating the user to the authentication server. At the authentication server, the signed service authentication confirmation can be processed for authentication by applying an appropriate key. The key may be stored in a database accessible by the authentication server, e.g. as a look-up table correlating the key with the user identity. Depending on the implementation, both symmetric and asymmetric encryption methods can be used for signing the service authentication confirmation and processing of the signed service authentication confirmation. Alternatively, the entering of the password may authorize the authentication device to release the service authentication confirmation for transmission to the authentication server. The introduction of the password proves the identity of the user operating the authentication device to the authentication server and prevents misuse, e.g. by another person who may get unauthorized access to the authentication device.

Preferably, the authentication device is a mobile phone providing a maximum of flexibility to the user. This applies also for other mobile devices providing the functionality of a mobile phone, e.g. a smart phone. Nowadays, mobile phones are widely used and have a high public acceptance and often offer access to mobile data services. It is very convenient for the user to have a mobile phone as authentication device instead of carrying multiple devices for different services. An additional advantage is, that the security mechanisms implemented by an operator in a mobile communication network are generally very high. Exchange of information over such a network provides a further enhancement of the security of the proposed method.

According to a preferred embodiment, the application device is a computer. Such a computer can be a stationary or mobile device, e.g. a PC, a workstation, a laptop or notebook, a pocket PC, or a personal digital assistance (PDA), attachable for example to a corporate computer network, the Internet or a wireless network for communicating at least with the service provider. The proposed method can also facilitate the login into a computer. Correlatively, the requested service is access to the computer which serves in this scenario simultaneously as application device and service provider.

According to another preferred embodiment, the application device is a payment device. A payment device is used for payment applications and can be an automated teller machine (ATM) offering banking services as bank account monitoring, retrieving money from a bank account, or the execution of a payment transaction. The payment device can be used in an electronic payment service enabling financial transactions, e.g. from one user to another user or institution, e.g. for transferring electronic cash from one person to another person or from one person to a stationary or mobile vendor, respectively.

According to another preferred embodiment, the application device is a physical access unit with a unit for data entry. The physical access unit can be a door or window, e.g. of a building, room, department in a company, or a vehicle. It can be also any other physical device where an authentication of the user is demanded before access to the physical device is granted, e.g. a steering wheel of a vehicle or an apparatus in a production facility. A unit for data entry is associated with the physical access unit. The unit for data entry is used to enter the user identity into the application device and can be a keypad or an Infrared (IR) or Bluetooth interface or any other kind of wired or wireless interface applicable for entering the user identity into the unit for data entry. For the case of an IR or Bluetooth interface, the user employs an IR- or Bluetooth equipped device, e.g. a mobile phone, in order to get access to the corresponding interface of the unit for data entry and to transfer the user identity. In addition, also supplementary information can be exchanged via the IR or Bluetooth interface, e.g. a status report stating user identity, time and identity of requested service. Access to the physical data unit can be provided when the user is authenticated to the service provider who is for example controlling a door. In this regard, the service provider can grant access to the requested service by unlocking the door by an electronically activated door-opener.

The present invention does also relate to an authentication server, which can be adapted to all embodiments of the method as described before. The authentication server comprises a receiving unit, a transmitting unit, and a processing unit. The receiving unit is adapted to receive a request for confirmation of a user identity from a service provider. The request comprises the user identity identifying a user and a service identity identifying a service of the service provider. The processing unit is adapted to generate a request for service authentication indicating the service to an authentication device of the user. The transmitting unit is adapted to send the request for service authentication to the authentication device. The receiving unit is adapted to receive a service authentication confirmation from the authentication device. The service authentication confirmation confirms the request for service authentication. The processing unit is adapted to execute an analysis of the received service authentication confirmation and to generate a confirmation of the user identity according to the result of the analysis. The confirmation of the user identity confirms the identity of the user to the service provider. The transmitting unit is adapted to send the confirmation of the user identity to the service provider.

According to a preferred embodiment of the authentication server, the processing unit is adapted to execute an authentication with at least one device from a group comprising the service provider and the authentication device and to exchange messages for the authentication via the receiving unit and the transmitting unit.

According to another preferred embodiment of the authentication server, the processing unit is adapted to execute a verification of at least one of the identities.

According to another preferred embodiment of the authentication server, an address of the authentication device is attributed to the user identity. The processing unit is adapted to retrieve the address from a database based on an analysis of the user identity.

According to another preferred embodiment of the authentication server, a keyword for identifying the authentication server to the authentication device is attributed to the user identity. The processing unit is adapted to retrieve the keyword from a database based on an analysis of the user identity and the transmitting unit is adapted to send the keyword to the authentication device.

According to another preferred embodiment of the authentication server, the processing unit is adapted to apply an encryption or signature or time stamp to at least one of the identities or confirmations or requests or to process encrypted or signed identities or confirmations or requests or to analyze a time stamp comprised in an identity or confirmation or request.

According to another preferred embodiment of the authentication server, the receiving unit and the transmitting unit are connectable to a mobile communication system.

The present invention also concerns a computer program loadable into a processing unit of an authentication server. The computer program comprises portions of software codes in order to implement the method as described above when operated on the authentication server. The computer program can be stored on a computer readable medium. The computer-readable medium can be a permanent or rewritable memory within authentication server or located externally. The computer program can be also transferred to the authentication server for example via a cable or a wireless link as a sequence of signals.

The computer program is adapted to perform the steps of processing of a request for confirmation of a user identity from a service provider with the request comprising the user identity identifying a user and a service identity identifying a service of the service provider, generating a request for service authentication indicating the service to an authentication device of the user, initializing of a transmission of the request for service authentication to the authentication device, executing an analysis of a service authentication confirmation from the authentication device with the service authentication confirmation confirming the request for service authentication, generating a confirmation of the user identity according to the result of the analysis, the confirmation of the user identity confirming the identity of the user to the service provider, initializing a transmission of the confirmation of the user identity to the service provider.

According to a preferred embodiment of the computer program, the computer program is adapted to generate and process messages for an authentication with at least one device from a group comprising the service provider and the authentication device.

According to another preferred embodiment of the computer program, the computer program is adapted to execute a verification of at least one of the identities.

According to another preferred embodiment of the computer program, an address of the authentication device is attributed to the user identity and the computer program is adapted to retrieve the address from a database.

According to another preferred embodiment of the computer program, a keyword is attributed to the user identity and the computer program is adapted to retrieve the keyword from a database and to initialize a transmission of the keyword to the authentication device.

According to another preferred embodiment of the computer program, the computer program is adapted to apply an encryption or signature or time stamp to at least one of the identities or confirmations or request or to process encrypted or signed identities or to analyze a time stamp comprised in an identity or confirmation or request.

In the following, detailed embodiments of the present invention shall be described in order to give the skilled person a full and complete understanding. However, these embodiments are illustrative and not intended to be limiting, as the scope of the invention is defined by the appended claims.

BRIEF DESCRIPTION OF THE DRAWINGS

FIG. 1a shows a flow-chart diagram of a method according to the present invention;

FIG. 1b shows messages and processes of the method in FIG. 1a;

FIG. 3 shows a second example for devices adapted to execute the invented method together with a corresponding message flow between the devices.

DETAILED DESCRIPTION OF THE INVENTION

Figure 1:
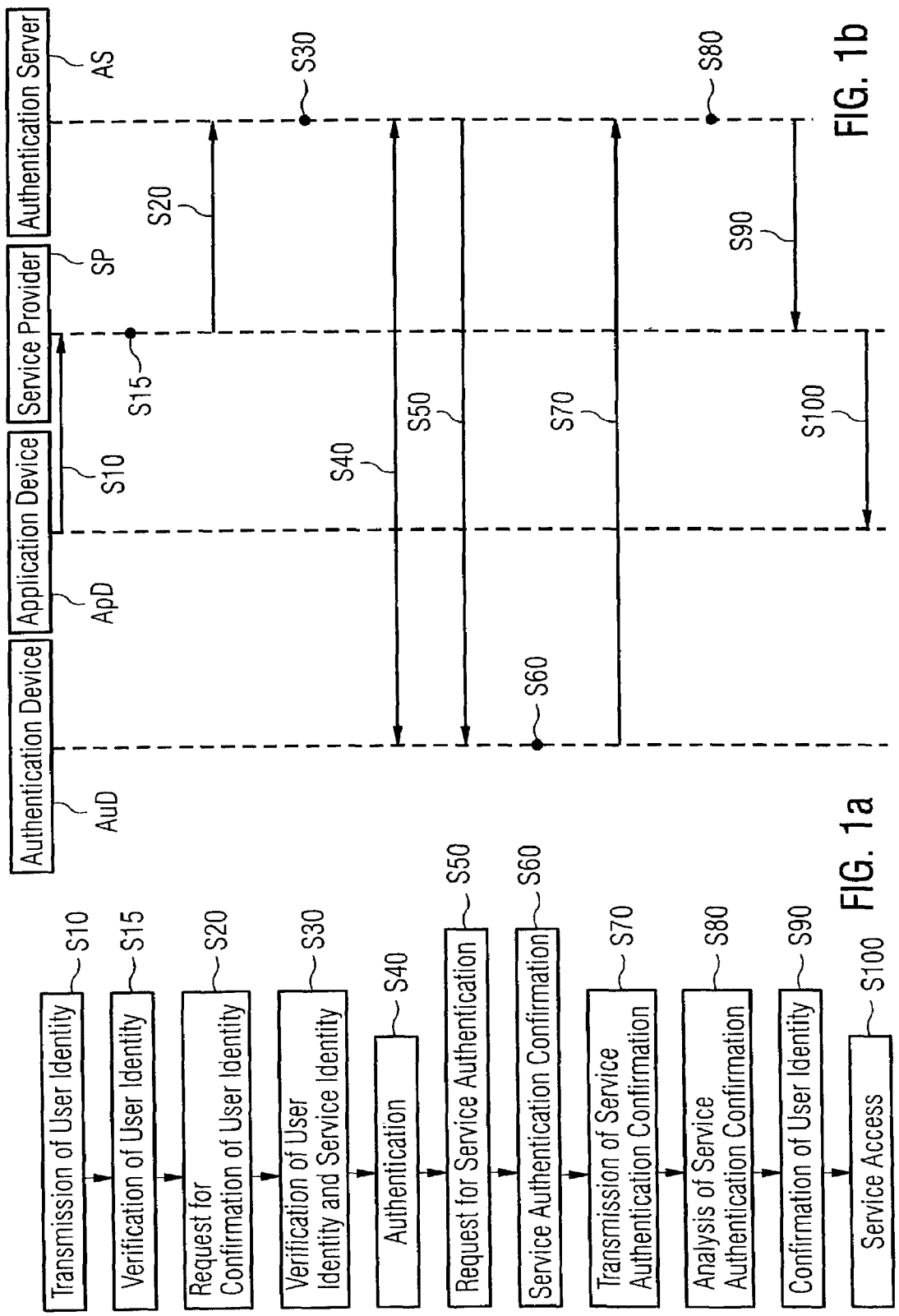

The following description focuses on the steps associated with messages or processes for carrying out the invented method. Depending on the implementation or case, it may be advantageous to integrate additional steps like a confirmation of a step before the next step is carried out. One or more pre-initialization steps can ensure the inter-operability of the respective devices involved in the method.

Communication between the devices involved in the proposed method is described in the following by individual messages which can be integrated in a dialog. Such a dialog can comprise the steps of an initialisation of the dialog, a transmission of a message comprising the information, and an end of the dialog. Typically, the dialog is executed synchronously, e.g. each step comprising a message originating from a first party is acknowledged by a confirmation message by a second party receiving the message before a new message is sent. The initialisation of the dialog can accomplish the authentication of both parties and ensures that the information is transmitted in a secure environment. Within the initialisation of the dialog, the parties can mutually agree on encryption or compression procedures. After successful initialisation of the dialog and transmission of the information, the end of dialog message confirms, that all previous messages have been transmitted in a complete and correct manner. Depending on the implementation or case, also more than one message can be sent within one dialog.

The exchange of information can be achieved over a fixed network like the Internet or a fixed telephone network like the Public Switched Telephone Network (PSTN) or the Integrated Services Digital Network (ISDN) or wireless connections provided e.g. by InfraRed (IR), Bluetooth, the Global System for Mobile communication (GSM), the Universal Mobile Telecommunication System (UMTS), or a Wireless Local Area Network (WLAN) or any combinations thereof.

Consequently, the devices involved in the proposed method incorporate interfaces for the exchange of information. A receiving unit is employed for receiving messages and a transmitting unit for sending messages. In addition, the devices have the functionality of processing messages or information, e.g. to generate a new message or to extract information from a received message or to analyze information comprised in a message. Preferably, information is indicated at least to the user, e.g. by display on a screen or by voice output. Typically, the user and the service provider SP are subscribed or registered to the proposed authentication mechanism, e.g. for storing and managing user and service provider SP related information by the authentication server AS and the service provider SP. Furthermore, the following examples are described in the context that the authentication device AuD is a mobile phone attachable to a mobile communication network like GSM or UMTS. However, also other wireless and wired interconnection techniques may be used for connecting the authentication device AuD to the authentication server AS.

An example for an authentication of a user to a service provider SP according to the present invention is depicted in FIGS. 1a and 1b. FIG. 1a shows a flow chart of the method whereas FIG. 1b reveals the corresponding processes and message flows between the application device ApD, the service provider SP, the authentication server AS, and the authentication device AuD.

In a first step of the method, the application device ApD requests a service for the user from the service provider SP and performs a transmission of the user identity S10 for identifying the user to the service provider SP. The service provider SP executes a verification S15 of the received user identity for example by checking if the user identity matches a respective entry in a database of the service provider SP. This procedure gives indication to the service provider SP if the transmitted user identity is already registered or subscribed to the requested service. If no respective entry is found by the service provider SP, the service provider SP may request a repeated transmission of the user identity S10, deny the service access S100, or request a registration. If necessary, the service provider SP can convert the identifier of the user identity for identifying the user to the authentication server AS. The service provider SP then selects a service identity attributed to the requested service for identifying the requested service to an authentication server AS. The service provider SP sends a request for the confirmation of the user identity S20 to the authentication server AS. The request comprises the user identity and the service identity for identifying the user and the service to the authentication server AS, respectively.

The authentication server AS performs a verification S30 of the received request in order to check if the user and the service are known to the authentication server AS and to convert the identifier of the service identity for indicating the requested service to the authentication device AuD if necessary. In addition, the authentication server AS comprises or has access to a database in which it searches for the address of the authentication device AuD of the user. If more than one address for the user identity is found, the authentication server AS may call for additional information to select the actual address of the authentication device AuD, e.g. by checking preference settings of the user indicating addresses for business and private use during certain day times or for specific services. Furthermore, the authentication server AS searches for a keyword attributed to the user identity and retrieves the keyword from the database according to the proposed method.

The authentication server AS performs an authentication S40 of the authentication server AS to the authentication device AuD. In the preferred scenario, the authentication device AuD is a mobile phone comprising a subscriber identity module (SIM) or wireless identity module (WIM) unique for each subscription. Very efficient and secure authentication mechanisms are customary for accomplishing a mutual authentication S40 between a mobile phone and a mobile operator. For the case the authentication server AS is operated by a mobile operator, further authentication between the devices may be omitted. Else, authenticated and secured communication between the authentication server AS and the mobile operator can be implemented using further authentication mechanisms, e.g. via the SSL protocol. The authentication server AS provides the mobile operator with an identifier for identifying the user to the mobile operator. This identifier is preferably a Mobile Station Integrated Services Digital Network (MSISDN) number of the user.

After successful authentication S40 of the authentication server AS and the authentication device AuD, the authentication server AS generates a request for service authentication S50 comprising the service identity and the keyword. Preferably, the authentication server AS adds a time stamp to the request and further protects the content of the request by applying an encryption and signature, e.g. using a public key of the user and a private key of the authentication server AS, respectively, according to an asymmetric encryption following the Rivest, Shamir & Adleman (RSA) encryption method or elliptic curve cryptography (ECC). The authentication server AS sends the request for service authentication S50 to the authentication device AuD.

The authentication device AuD checks the signature and decrypts the received request for service authentication S50 if necessary, e.g. by applying a corresponding public key of the authentication server AS and a corresponding private key of the user, respectively. Optionally, the time stamp is checked and the authentication procedure is aborted if the time stamp is expired, e.g. when the duration between the date of issue of the time stamp and the check of the time stamp exceeds a time limit. The request for service authentication S50 is indicated to the user. The indicated request comprises in particular the keyword as well as the service identity and can be indicated on the display of the mobile phone of the user or by voice output. An example for such an indication is a phrase like "Authenticate . . . KEYWORD . . . and . . . SERVICE . . . " with KEYWORD being the keyword and SERVICE being the name of the requested service known to the user. Additionally, a date can be indicated, e.g. derived from a time stamp. The user is asked to confirm the indicated request by a password, e.g. by typing in a PIN for authenticating the user to the authentication server AS. This PIN is preferably different to the PIN used for getting access to the authentication device AuD. If the user accepts the indicated information, he enters the PIN for confirmation. If he enters the correct PIN, the authentication device AuD is triggered to sign the service authentication confirmation S60. This signature confirms that the correct PIN has been entered and thus proves the identity of the user to the authentication server AS. Subsequently, the authentication device AuD performs a transmission S70 of the service authentication confirmation to the authentication server AS.

Depending on the implementation of the proposed method, it may be advantageous to integrate the authentication S40, the request for service authentication S50, the service authentication confirmation S60, and the transmission S70 of the service authentication in a single dialog in order to reduce signaling effort between the authentication server AS and the authentication device AuD.

The authentication server AS executes an analysis S80 of the received service authentication confirmation S60 and authenticates the user by checking the correctness of the signature or password applied to the service authentication confirmation S60. The authentication server AS analyzes the content of the service authentication confirmation S60 in which an identifier can state the confirmation of the request for service authentication S50. The authentication server AS may check, if additional information, e.g. a time stamp, is included in the transmitted service authentication confirmation S60. It may optionally store data associated with the authentication procedure in a database for providing a history of authentication transactions or archival storage due to security reasons.

Subsequently, the authentication server AS provides the service provider SP with a confirmation of the user identity S90, e.g. by giving a positive confirmation of the request for confirmation of the user identity S20, proving the authenticity of the user identity to the service provider SP. Finally, the service provider SP may grant service access S100 to the requested service or may ask for additional information.

Figure 2:
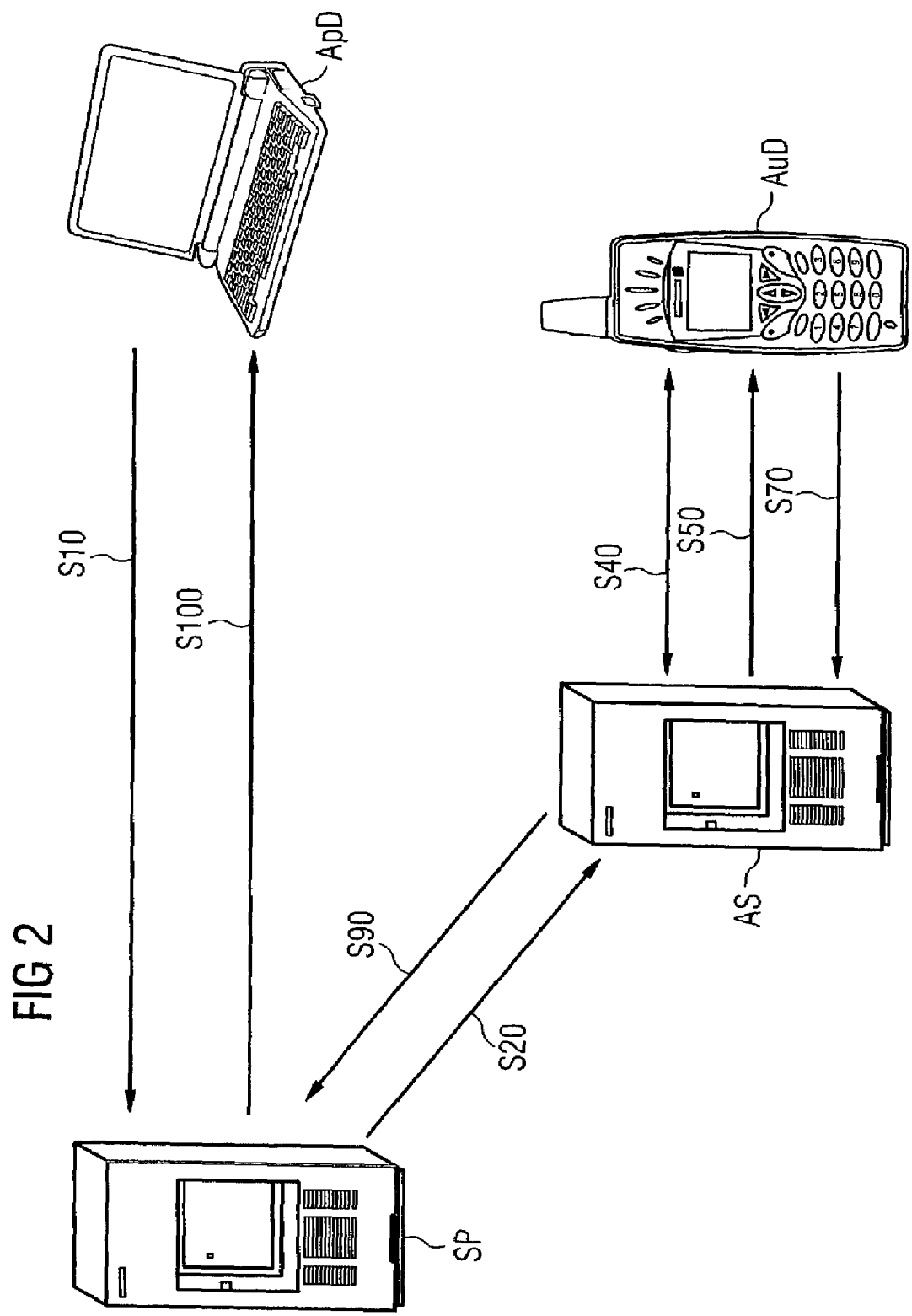
FIG. 2 shows a first example for devices adapted to execute the invented method together with a corresponding message flow between the devices.

In FIG. 2, a first example of a set of devices for executing the proposed method is depicted. In addition, the flow of messages according to FIG. 1 is shown. In this example, the application device ApD is embodied in a laptop computer with interfaces for sending and receiving messages like the transmission of the user identity S10 to the service provider SP or the grant of service access S100 by the service provider SP, respectively. The laptop incorporates a processing unit, e.g. for generation and processing of messages and information for example for executing the requested service or performing an encryption of sent or decryption of received messages. Other functions are a keyboard for typing in a user identity and a monitor for displaying information.

The service provider SP is a server adapted to communicate with the application device ApD and the authentication server AS. Typically, a large number of application devices are served by such a server. The service provider SP also comprises interfaces in order to exchange messages with the application device ApD and the authentication server AS and a processing unit for processing of information and messages according to the proposed method.

The authentication server AS comprises a receiving unit and a transmitting unit for receiving and transmitting messages, respectively, according to the proposed method. Furthermore, the authentication server AS comprises a processing unit. Within the authentication server AS, the individual units are connected such that messages received by the receiving unit are guided to the processing unit, whereas messages originating from the processing unit are sent via the transmitting unit. Access to a database is accomplished by the processing unit. The database can be located in the authentication server or externally.

The processing unit is adapted to verify the service identity and the user identity from a request for confirmation of the user identity S20, e.g. by checking if the received data matches a respective entry in the database. The processing unit is furthermore adapted to retrieve the address of the authentication device AuD and the keyword from the database and to execute the authentication S40 related steps of the communication with the authentication device AuD of the user, e.g. initialization of a dialog, sending an identifier for identification of the authentication server AS, receiving and analyzing an identifier for identification of the authentication device AuD, and finalizing the dialog. Such identifiers are known by both devices and can be signed by a secret or private key according to symmetric or asymmetric encryption method, respectively. The processing unit is also adapted to encrypt or decrypt a sent or received identifier, respectively, or to apply a signature to a sent identifier or to check a signature of a received identifier, e.g. by applying an appropriate key. Also other techniques for authentication are possible and the processing unit may be adapted to execute other security mechanisms like the establishment of a SSL-protected connection to the authentication device AuD or the service provider SP.

In addition, the processing unit of the authentication server AS is adapted to generate a request for service authentication S50 comprising the service identity for identifying the service to the authentication device AuD of the user and the keyword for identifying the authentication server AS to the user and the transmitting unit is adapted to send the request to the authentication device AuD of the user. The receiving unit of the authentication server AS is adapted to receive a confirmation of the request and the processing unit of the authentication server AS is adapted to execute an analysis S80 of the confirmation. The processing unit of the authentication server AS is further adapted to generate a confirmation for the user identity S90 based on the result of the analysis S80 and to send this confirmation to the service provider SP.

The authentication device AuD in FIG. 2 is a mobile phone comprising a receiving unit for receiving messages like the request for the service authentication S50, and a transmitting unit for sending messages like the transmission S70 of the service authentication confirmation. In the authentication S40, both the receiving unit as well as the transmitting unit are involved. The processing unit is adapted to process information, e.g. derived from the request for service authentication S50 such that the request is indicated to the user. In addition, the keypad of the mobile phone can be used to confirm the request, e.g. by entering a PIN. Obviously, the processing unit can be adapted to apply an encryption method for encryption and signatures. Alternatively, such an encryption method can be performed in the SIM card accessible by the processing unit of the mobile phone.

A typical access situation according to FIG. 2 is the login to a service application on a computer network like the Internet. In this example, the user uses a mobile phone with WAP functionality as authentication device AuD and a computer as application device ApD. The user sends his user identity from the application device ApD to the service provider SP, which contacts the authentication server AS with a request for confirmation of the user identity S20. The authentication server AS verifies the user and the service and retrieves the address of the authentication device AuD, which is in this example the MSISDN number of the WAP phone. In addition, the authentication server AS retrieves the keyword. The authentication server AS contacts the authentication device AuD of the user by a WAP push message directing him to a Wireless Markup Language (WML) Script containing the command "signText". The generic text can be like "Authenticate . . . KEYWORD . . . and . . . SERVICE . . . ". In order to sign the text, the user enters his signText PIN and the signature is sent back to the authentication server AS, which checks the correctness of the signature. If the PIN has been correctly entered, the authentication server AS sends the confirmation of the user identity S90 to the service provider SP, which may grant service access S100 for the application device ApD to the requested Internet service.

In FIG. 3, a further scenario is depicted. Here the user demands access to an application device ApD consisting of a physical access unit D shown as a locked door equipped with a unit for data entry KP, both connectable to the service provider SP for transmission of the user identity S10 and receiving a message or signal for service access S100, respectively. Alternatively, the physical access unit D and the unit for data entry KP are connectable to an intermediate device located for example within the application device ApD establishing the communication with the service provider SP. The user enters his user identity e.g. by typing a number into a keypad. Alternatively, the unit for data entry KP may be a IR or Bluetooth receiving unit or an RF-tag reader. For such an access situation, the user can make use of the mobile phone, e.g. the one that he employs later in the authentication procedure as authentication device AuD, in order to send his user identity to the unit for data entry KP. This is indicated in FIG. 3 by the transfer B0 of the user identity. For carrying out the transfer B0, the mobile phone is equipped with a IR or Bluetooth transmitting unit or an RF-tag. However, also other connection techniques are possible for the transfer B0 or generally for entering the user identity into the unit for data entry KP, e.g. by using a cable or a PDA-like hot-synchronization mechanism with a cradle. For granting service access S100, the service provider SP sends a message or signal to the application device ApD and thus unlocks the door. Beside that, the other devices incorporated in the method like the service provider SP, the authentication server AS, and the authentication device AuD, and the corresponding message flow remain unchanged compared to FIG. 2.

The above embodiments admirably achieve the objects of the invention. However, it will be appreciated that departures can be made by those skilled in the art without departing from the scope of the invention which is limited only by the claims.

The invention claimed is:

1. A method for authentication of a user, wherein an application device requests a service for the user from the service provider and the service provider requests an authentication of the user by an authentication server before granting access to the requested service, wherein the following steps are performed:
   transmitting a user identity from the application device to the service provider,
   transmitting a request for confirmation of the user identity from the service provider, to an authentication server with the request comprising
   a service provider generated user identity for providing the user's identity to the authentication server and a first service identity for identifying the requested service to the authentication server, the user identity being identical to the received user identity or being derived from the received user identity by a conversion performed by the service provider (SP);

the authentication server verifying the received identities;

the authentication server deriving a second service identity from the first service identity for identifying the requested service to an authentication device associated with the user;

transmitting a request for service authentication from the authentication server to the authentication device of the user with the request for service authentication indicating the requested service to the authentication device, generating a service authentication confirmation confirming the request for service authentication, transmitting the service authentication confirmation from the authentication device to the authentication server, analyzing the service authentication confirmation:

confirming the user identity to the service provider according to the result of the analysis; and granting of service access to the user by the service provider according to the confirmation of the user identity.

2. The method according to claim 1, wherein an authentication is performed between at least one pair of devices from a group comprising the pairs:

the application device and the service provider;
the service provider and the authentication server;
the authentication server and the authentication device.

3. The method according to claim 1, wherein the service provider verifies the received user identity and/or the authentication device performs a verification of the received service identity.

4. The method according to claim 1, wherein an address of the authentication device is attributed to the user identity and the authentication server retrieves the address based on an analysis of the user identity.

5. The method according to claim 1, wherein a keyword for identifying the authentication server to the authentication device is attributed to the user identity, the authentication server retrieving the keyword based on an analysis of the user identity and sending the keyword to the authentication device, which displays the keyword.

6. The method according to claim 5, wherein the keyword is included into the request for service authentication.

7. The method according to claim 1, wherein an encryption or signature or time stamp is applied to one of the identities or confirmations or requests.

8. The method according to claim 1 wherein the generation of the service authentication confirmation or the transmission of the service authentication confirmation requires an entering of a password.

9. The method according to claim 1 wherein the authentication device is a mobile phone.

10. The method according to claim 1, wherein the application device is a computer.

11. The method according to claim 1, wherein the application device is a payment device.

12. The method according to claim 1 wherein the application device is a physical access unit with a unit for data entry.

13. An authentication server comprising a receiving unit, a transmitting unit, and a processing unit, wherein the receiving unit is adapted to receive a request for confirmation of a user identity from a service provider with the request comprising a service provider generated user identity and a first service identity for identifying a service of the service provider;

the processing unit being adapted to execute a verification of the received identities;

the authentication server being adapted to derive a second service identity from the first service identity for identifying the reguested service to an authentication device associated with the user;

the processing unit is adapted to generate a request for service authentication indicating the service to an authentication device of the user:

the transmitting unit is adapted to send the request for service authentication to the authentication device;

the receiving unit is adapted to receive a service authentication confirmation from the authentication device confirming the request for service authentication;

the processing unit is adapted to execute an analysis of the received service authentication confirmation and to generate a confirmation of the user identity according to the result of the analysis, the confirmation of the user identity confirming the identity of the user to the service provider; and the transmitting unit is adapted to send the confirmation of the user identity to the service provider.

14. The authentication server according to claim 13, wherein the processing unit is adapted to execute an authentication with at least one device from a group comprising the service provider and the authentication device and to exchange messages for the authentication via the receiving unit and the transmitting unit.

15. The authentication server according to claim 13, wherein the processing unit is adapted to execute a verification of at least one of the identities.

16. The authentication server according to claim 13, wherein an address of the authentication device is attributed to the user identity and the processing unit is adapted to retrieve the address from a database based on an analysis of the user identity.

17. The authentication server according to claim 13, wherein a keyword for identifying the authentication server to the authentication device is attributed to the user identity, the processing unit is adapted to retrieve the keyword from a database based on an analysis of the user identity and the transmitting unit is adapted to send the keyword to the authentication device.

18. The authentication server according to claim 13, wherein the processing unit is adapted to apply an encryption or signature or time stamp to at least one of the identities or confirmations or requests or to process encrypted or signed identities or confirmations or requests or to analyze a time stamp comprised in an identity or confirmation or request.

19. The authentication server according to claim 13, wherein the receiving unit and the transmitting unit are connected to a mobile communication system.

20. A computer program loadable into a processing unit of an authentication server, wherein the computer program is adapted to perform the steps of processing of a request for confirmation of a user identity from a service provider with the request comprising the user identity and a first service identity identifying a requested service;

generating a request for service authentication to an authentication device of the user, wherein the request includes a second service identity derived from the first service identity;

initializing a transmission of the request for service authentication to the authentication device;
executing an analysis of a service authentication request confirmation from the authentication device;
generating a confirmation of the user identity according to the result of the analysis. the confirmation of the user identity confirming the identity of the user to the service provider; and
transmitting the confirmation of the user identity to the service provider.

21. The computer program according to claim 20, wherein the computer program is adapted to generate and process messages for an authentication with at least one device from a group comprising the service provider and the authentication device.

22. The computer program according to claim 20, wherein the computer program is adapted to execute a verification of at least one of the identities.

23. The computer program according to claim 20, wherein an address of the authentication device is attributed to the user identity and the computer program is adapted to retrieve the address from a database.

24. The computer program according to claim 20, wherein a keyword is attributed to the user identity and the computer program is adapted to retrieve the keyword from a database and to initialize a transmission of the keyword to the authentication device.

25. The computer program according to claim 20, wherein the computer program is adapted to apply an encryption or signature or time stamp to at least one of the identities or confirmations or request or to process encrypted or signed identities or to analyze a time stamp comprised in an identity or confirmation or request.

26. A node comprising:
a receiving unit, the receiving unit being adapted for receiving a request for confirmation of a user identity from a service provider, the request comprising the user identity and a first service identity identifying a service requested by the user to the node;
a processing unit, the processing unit, in response to receipt of the confirmation request, being adapted for verifying the received identities and generating a request for service authentication, wherein the request for service authentication comprises
a second service identity derived from the first service identity and
a keyword associated with the user identity for identifying the node to an authentication device associated with the user,
wherein the keyword is retrieved from a database available to the node
a transmitting unit being adapted to send the request for service authentication to the authentication device;
the receiving unit is further adapted to receive a service authentication response from the authentication device, the service authentication response confirming the request for service authentication;
the processing unit further being adapted to analyze the received service authentication confirmation and to generate a confirmation of the user identity, wherein the confirmation of the user identity is for confirming the user identity to the service provider; and
the transmitting unit being adapted to send the confirmation of the user identity to the service provider.

* * * * *

UNITED STATES PATENT AND TRADEMARK OFFICE
CERTIFICATE OF CORRECTION

| | | |
|---|---|---|
| PATENT NO. | : 7,188,360 B2 | Page 1 of 1 |
| APPLICATION NO. | : 10/225834 | |
| DATED | : March 6, 2007 | |
| INVENTOR(S) | : Gerdes et al. | |

It is certified that error appears in the above-identified patent and that said Letters Patent is hereby corrected as shown below:

In Column 15, Line 23, in Claim 1, after "granting" delete "of".

In Column 16, Line 8, in Claim 13, delete "reguested" and insert -- requested --, therefor.

In Column 16, Line 60, in Claim 20, after "processing" delete "of".

Signed and Sealed this

Second Day of September, 2008

JON W. DUDAS
*Director of the United States Patent and Trademark Office*